(12) United States Patent
Lai

(10) Patent No.: US 11,310,403 B2
(45) Date of Patent: Apr. 19, 2022

(54) CAMERA MODULE AND CALIBRATION METHOD THEREOF

(71) Applicant: PRIMAX ELECTRONICS LTD., Taipei (TW)

(72) Inventor: Chin-Ding Lai, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 183 days.

(21) Appl. No.: 16/659,641

(22) Filed: Oct. 22, 2019

(65) Prior Publication Data

US 2021/0051247 A1   Feb. 18, 2021

(30) Foreign Application Priority Data

Aug. 16, 2019  (TW) .................... 108129299

(51) Int. Cl.
*H04N 5/225* (2006.01)
*H02N 2/02* (2006.01)
*H02N 2/06* (2006.01)
*G02B 7/02* (2021.01)

(52) U.S. Cl.
CPC ........... *H04N 5/2253* (2013.01); *H02N 2/028* (2013.01); *H02N 2/062* (2013.01); *H04N 5/2254* (2013.01); *G02B 7/021* (2013.01)

(58) Field of Classification Search
CPC .... H04N 5/2253; H04N 5/2254; H02N 2/028; H02N 2/062; G02B 7/021; G02B 7/025
See application file for complete search history.

(56) References Cited

U.S. PATENT DOCUMENTS

| 8,675,114 | B2* | 3/2014 | Watanabe | ......... H01L 27/14627 |
| | | | | 348/335 |
| 2010/0026852 | A1* | 2/2010 | Ng | ........................ G02B 3/0056 |
| | | | | 348/E5.022 |
| 2020/0217719 | A1* | 7/2020 | Parrish | .................. G01J 5/0806 |
| 2020/0357838 | A1* | 11/2020 | Fukuyama | ............. G02B 7/021 |
| 2020/0393637 | A1* | 12/2020 | Ryoo | ..................... H02N 2/142 |

* cited by examiner

*Primary Examiner* — Timothy J Henn
*Assistant Examiner* — Angel L Garces-Rivera
(74) *Attorney, Agent, or Firm* — WPAT, PC

(57) ABSTRACT

A camera module includes a substrate, a sensing chip, a lens module and a piezoelectric plate. The sensing chip is electrically connected with the substrate. The sensing chip includes a sensing region. The sensing chip is covered by the lens module. The sensing chip is arranged between the substrate and the lens module. When an external light beam passes through the lens module and projected on the sensing region, the sensing chip generates an image. The piezoelectric plate is arranged between the substrate and the lens module. When an electric power is provided to the piezoelectric plate, the piezoelectric plate is subjected to deformation, so that the lens group focuses on the sensing region. The present invention also provides a calibration method for the camera module.

18 Claims, 4 Drawing Sheets

CAMERA MODULE AND CALIBRATION METHOD THEREOF

FIELD OF THE INVENTION

The present invention relates to an optical field, and more particularly to a camera module and a calibration method thereof.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various camera modules are widely used in many kinds of fields such as smart phones, wearable electronic devices or any other appropriate portable electronic devices. Since the electronic devices are small and portable, the users can take the electronic devices to capture images and store the images according to the users' requirements. Alternatively, the images can be uploaded to the internet through mobile networks. In other words, these electronic devices not only have important commercial values but also provide more colorful lives to people.

The structure of a conventional camera module will be illustrated with reference to FIGS. 1 and 2. FIG. 1 is a schematic perspective view illustrating the outward appearance of a conventional camera module. FIG. 2 is a schematic side view illustrating the conventional camera module as shown in FIG. 1. For example, the conventional camera module is disclosed in Taiwanese Patent Application No. TW106130015, which was filed by the same Applicant of this application. The camera module 1 comprises a substrate 11, a sensing chip 12 and a lens module 13. The lens module 13 comprises a lens holder 131 and a lens group 132. The lens group 132 is supported on the lens holder 131. The lens group 132 comprises plural optical lenses. Each of the optical lenses is a plastic lens or a glass lens. The sensing chip 12 is disposed on a top surface 111 of the substrate 11 and electrically connected with the substrate 11. The sensing chip 12 is covered by the lens holder 131. Consequently, the sensing chip 12 is arranged between the lens module 13 and the substrate 11. After the above components are combined together, the camera module 1 is assembled. After the external light beam passes through the lens group 132 and the lens holder 131 sequentially, the external light beam is projected on the sensing chip 12. Consequently, the sensing chip 12 produces the corresponding image.

Moreover, during the process of assembling the camera module 1, a thermosetting glue 14 is filled in the region between the lens holder 131 of the lens module 13 and the substrate 11. After thermosetting glue 14 is baked, the lens module 13 and the substrate 11 are combined together through the thermosetting glue 14. Consequently, the sensing chip 12 is completely sealed within the space between the lens module 13 and the substrate 11. Since the particles in the surroundings are prevented from entering the camera module 1, the travelling path of the light beam is not adversely affected. Moreover, the unpredicted light beam in the surroundings (e.g., a stray light) is blocked by the thermosetting glue 14 and prevented from entering the camera module 1.

However, the conventional camera module 1 still has some drawbacks. For example, if a defocusing problem occurs, the sensing chip 12 cannot acquire the sharp image. The applicant found that if the required spacing distance between the lens group 132 and the sensing chip 12 is changed, the lens group 132 cannot precisely focus on the sensing chip 12. Generally, there are two factors that cause the change of the spacing distance between the lens group 132 and the sensing chip 12. Firstly, after the thermosetting glue 14 is baked, the problem of generating uncontrollable shrunken glue occurs. Secondly, since different optical lenses of the lens group 132 are made of different materials, the optical lenses have different expansion/deformation ratios at the same temperature.

Nowadays, most camera modules of the portable electronic devices or the vehicular electronic devices have the fixed-focus structures. If the defocusing problem of the camera module 1 occurs, the focal length of the lens group 132 cannot be changed. That is, the imaging quality of the camera module 1 cannot be improved.

Therefore, there is a need of providing an improved camera module in order to overcome the drawbacks of the conventional technologies.

SUMMARY OF THE INVENTION

An object of the present invention provides a camera module comprising a lens module, a sensing chip and a piezoelectric plate. During the image capturing process, a spacing distance between the lens module and the sensing chip continuously matches the focal length of the lens group in response to the deformation of the piezoelectric plate. Consequently, the defocusing problem occurred in the conventional technologies can be overcome. Since the piezoelectric plate has the enhanced control precision and small volume, the camera module of the present invention is suitably applied to the portable electronic device and the vehicular electronic device. Consequently, the portable electronic device and the vehicular electronic device can be developed toward small size and light weightiness.

An object of the present invention provides a calibration method for the camera module of the present invention.

In accordance with an aspect of the present invention, a camera module is provided. The camera module includes a substrate, a sensing chip, a lens module and a piezoelectric plate. The sensing chip is electrically connected with the substrate. The sensing chip includes a sensing region. The sensing chip is covered by the lens module. The sensing chip is arranged between the substrate and the lens module. When an external light beam passes through the lens module and projected on the sensing region, the sensing chip generates an image. The piezoelectric plate is arranged between the substrate and the lens module. When an electric power is provided to the piezoelectric plate, the piezoelectric plate is subjected to deformation, so that the lens group focuses on the sensing region.

In accordance with another aspect of the present invention, a calibration method for a camera module is provided. The camera module includes a substrate, a sensing chip, a lens module and a piezoelectric plate. The sensing chip is electrically connected with the substrate. The sensing chip is covered by the lens module and arranged between the substrate and the lens module. The piezoelectric plate is arranged between the substrate and the lens module. The calibration method includes the following steps. If a spacing distance between the lens group and the sensing chip does not match a focal length of the lens group, a value of an electric power for driving the deformation of the piezoelectric plate to have the spacing distance between the lens group and the sensing chip match the focal length of the lens group is acquired. Then, the value of the electric power is stored. When the camera module is enabled to perform an image capturing operation, the value of the electric power is provided to the piezoelectric plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
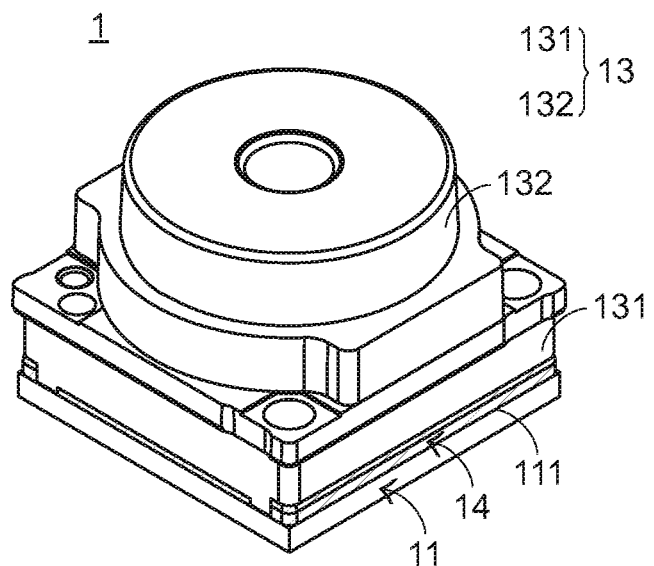
FIG. 1 is a schematic perspective view illustrating the outward appearance of a conventional camera module.
Figure 2:
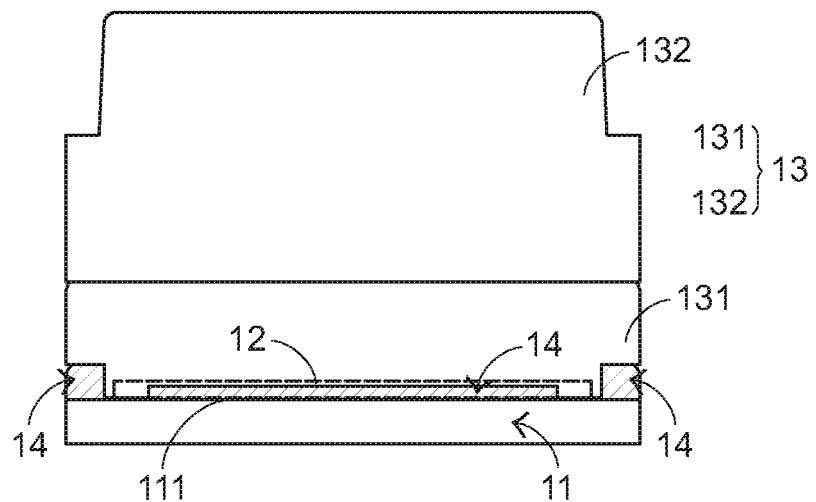
FIG. 2 is a schematic side view illustrating the conventional camera module as shown in FIG. 1.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 3:
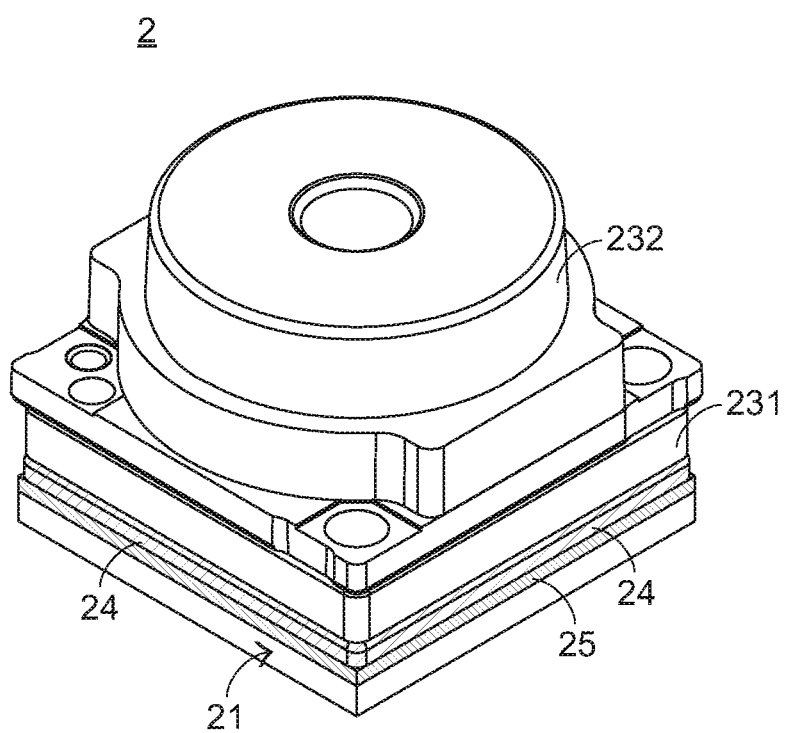
FIG. 3 is a schematic perspective view illustrating the appearance of a camera module according to an embodiment of the present invention.
Figure 4:
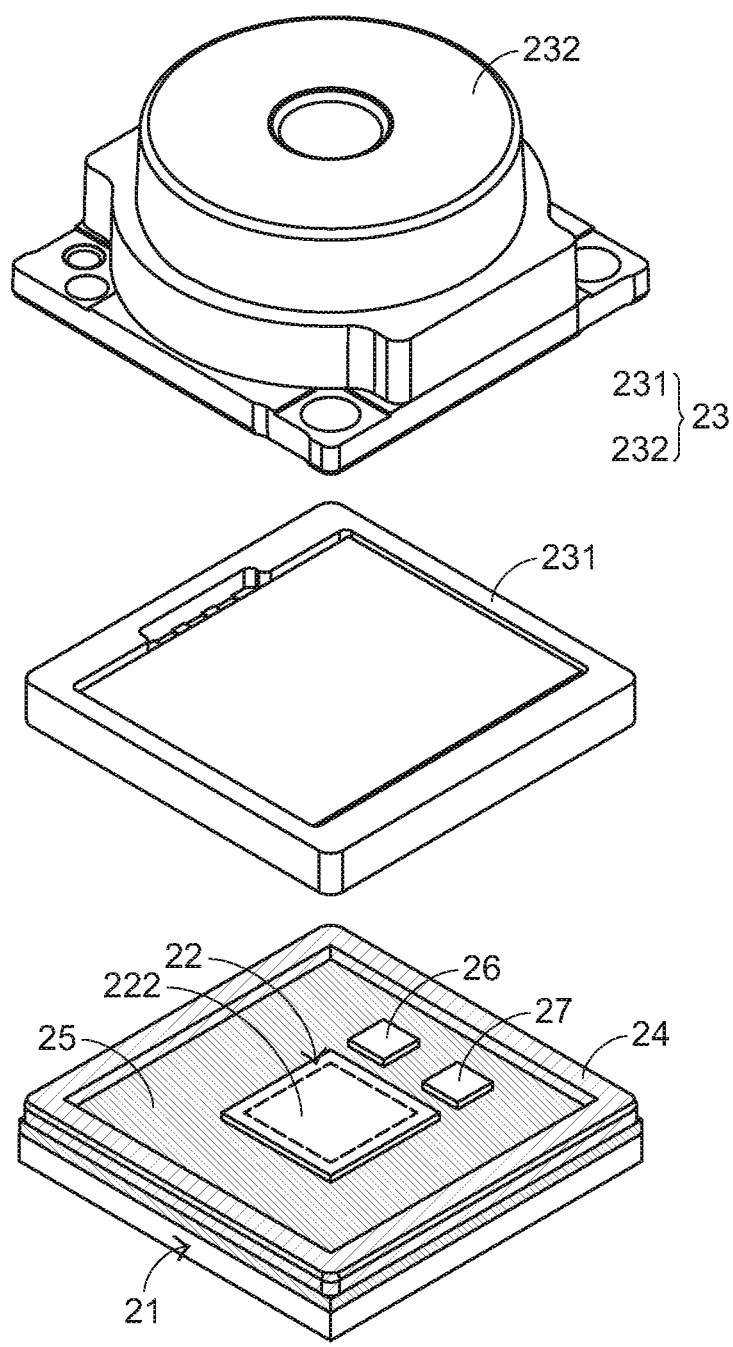
FIG. 4 is a schematic exploded view illustrating a portion of the camera module as shown in FIG. 3.
Figure 5:
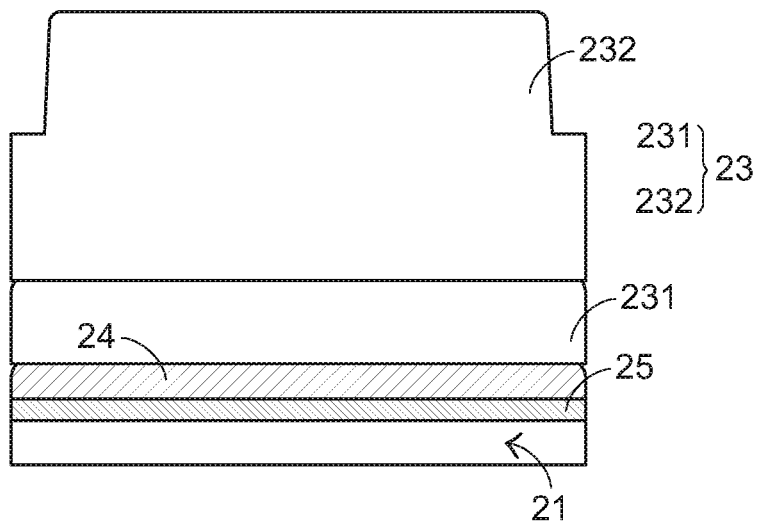
FIG. 5 is a schematic side view illustrating a portion of the camera module as shown in FIG. 3.

Please refer to FIGS. 3, 4 and 5. FIG. 3 is a schematic perspective view illustrating the appearance of a camera module according to an embodiment of the present invention. FIG. 4 is a schematic exploded view illustrating a portion of the camera module as shown in FIG. 3. FIG. 5 is a schematic side view illustrating a portion of the camera module as shown in FIG. 3. In an embodiment, the camera module 2 comprises a substrate 21, a sensing chip 22, a lens module 23, a piezoelectric plate 25, a driving chip 26 and a memory 27. The sensing chip 22 comprises a sensing region 222. The sensing chip 22, the driving chip 26 and the memory 27 are disposed on a top surface of the substrate 21 and electrically connected with the substrate 21. The lens module 23 comprises a lens holder 231 and a lens group 232. The lens group 232 is supported on the lens holder 231. The lens group 232 comprises at least one optical lens (not shown). The sensing chip 22 is covered by the lens holder 231. Consequently, the sensing chip 22 is arranged between the lens module 23 and the substrate 21.

After the above components are combined together, the camera module 2 is assembled. After the external light beam (not shown) passes through the lens module 23, the external light beam is projected on the sensing region 222 of the sensing chip 22. Consequently, the sensing chip 22 produces the corresponding image. Subsequently, the substrate 21 performs the signal processing operation on the image. An example of the substrate 21 includes but is not limited to a flexible printed circuit board, a rigid-flex board, a copper clad laminate or a ceramic substrate. Preferably but not exclusively, the lens module 23 is a fixed-focus lens module.

The piezoelectric plate 25 is arranged between the substrate 21 and the lens module 23. A top surface of the piezoelectric plate 25 is connected with the lens module 23. A bottom surface of the piezoelectric plate 25 is connected with the substrate 21. Preferably but not exclusively, the piezoelectric plate 25 is a piezoelectric ceramic plate or a macro fiber composite (MFC) structure. The piezoelectric plate 25 has a hollow structure. The sensing chip 22 is enclosed by the hollow structure. A glue 24 is disposed on a periphery region of the top surface of the piezoelectric plate 25. The piezoelectric plate 25 is connected with the lens module 23 through the glue 24. The bottom surface of the piezoelectric plate 25 is connected with the substrate 21 through a surface mount technology or an adhesive (not shown).

The driving chip 26 is electrically connected between the substrate 21 and the piezoelectric plate 25. The driving chip 26 provides electric power to the piezoelectric plate 25 to drive deformation of the piezoelectric plate 25. In response to the deformation of the piezoelectric plate 25, a spacing distance between the lens group 232 and the sensing chip 22 is calibrated. For allowing the camera module 2 to acquire the sharp image, the spacing distance between the lens group 232 and the sensing chip 22 needs to match the focal length of the lens group 232. However, during the process of fabricating the camera module 2, the designed spacing distance between the lens group 232 and the sensing chip 22 is possibly changed because of some uncontrollable factors. For, after the glue 24 is baked, the problem of generating uncontrollable shrunken glue occurs. Moreover, since different optical lenses of the lens group 232 are made of different materials, the optical lenses have different expansion/deformation ratios at the same temperature. In accordance with the present invention, the spacing distance between the lens group 232 and the sensing chip 22 is adjusted in response to the deformation of the piezoelectric plate 25. Since the spacing distance between the lens group 232 and the sensing chip 22 can match the focal length of the lens group 232, the lens group 232 can precisely focus on the sensing region 222 of the sensing chip 22.

Figure 6:
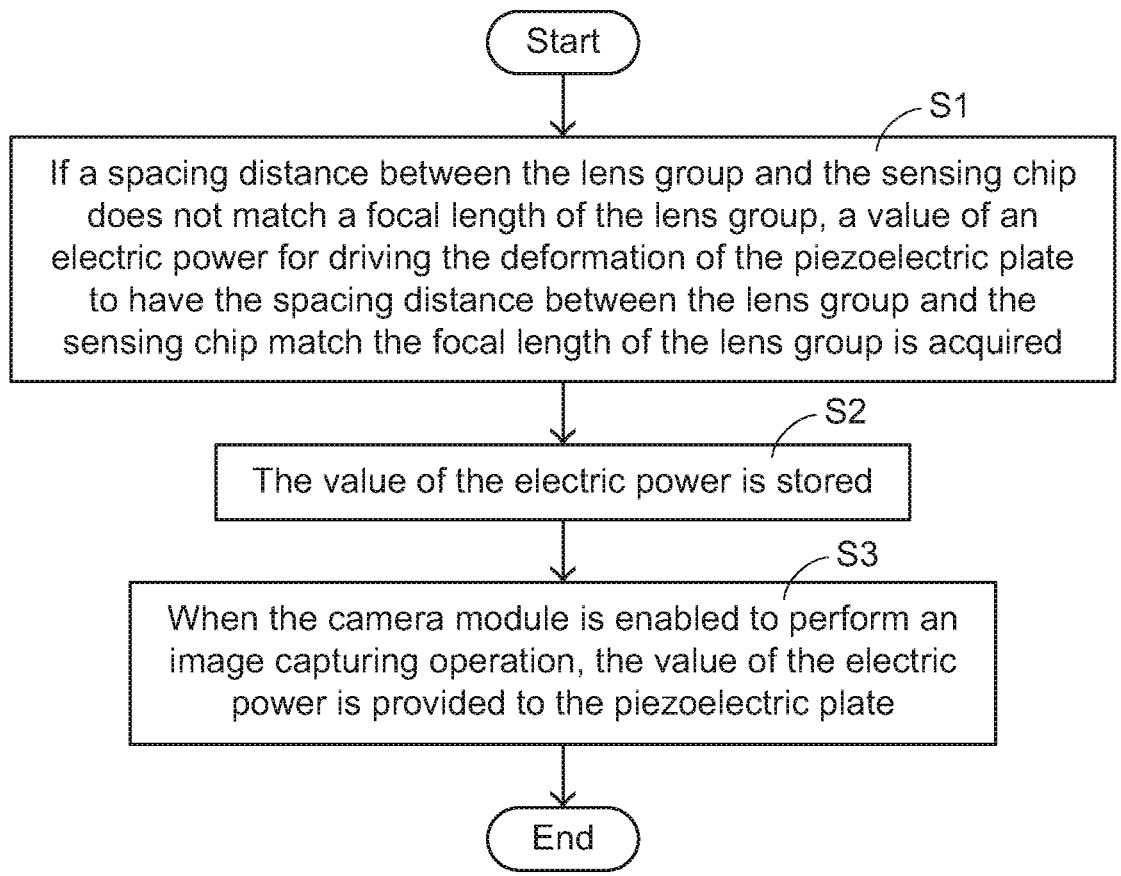
FIG. 6 is a flowchart illustrating a calibration method for a camera module according to an embodiment of the present invention.

The present invention further provides a calibration method for the camera module 2. FIG. 6 is a flowchart illustrating a calibration method for a camera module according to an embodiment of the present invention.

Firstly, if the spacing distance between the lens group 232 and the sensing chip 22 does not match the focal length of the lens group 232, a value of the electric power (e.g., a voltage value) for driving the deformation of the piezoelectric plate 25 to have the spacing distance between the lens group 232 and the sensing chip 22 match the focal length of the lens group 232 is acquired (Step S1). Then, the value of the electric power is stored (Step S2). In an embodiment, the step S1 and the step S2 are performed before the camera module 2 leaves the factory. Moreover, the value of the electric power that is acquired in the step S1 is stored in the memory 27. For example, the memory 27 is an electrically-erasable programmable read-only memory (EEPROM). When the camera module 2 is enabled to perform an image capturing operation, the value of the electric power is provided to the piezoelectric plate 25 (Step S3). That is, the value of the electric power stored in the memory 27 is provided to the piezoelectric plate 25 when the camera module 2 is enabled to perform the image capturing operation. Consequently, the spacing distance between the lens group 232 and the sensing chip 22 matches the focal length of the lens group 232.

From the above descriptions, the present invention provides the camera module. According to the practical requirements, the camera module is equipped with the piezoelectric plate. The piezoelectric plate can be subjected to the tiny deformation. During the image capturing process, a spacing distance between the lens module and the sensing chip continuously matches the focal length of the lens group in response to the deformation of the piezoelectric plate. Consequently, the camera module is capable of acquiring the sharp image, and the defocusing problem occurred in the conventional technologies can be overcome. Since the piezoelectric plate has the enhanced control precision and small volume, the camera module of the present invention is suitably applied to the portable electronic device and the vehicular electronic device. Consequently, the portable electronic device and the vehicular electronic device can be developed toward small size and light weightiness.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A camera module, comprising:
   a substrate;
   a sensing chip electrically connected with the substrate, wherein the sensing chip comprises a sensing region;
   a lens module, wherein the sensing chip is covered by the lens module, and the sensing chip is arranged between the substrate and the lens module, wherein when an external light beam passes through the lens module and projected on the sensing region, the sensing chip generates an image, and the lens module comprises a lens holder and a lens group supported on the lens holder; and
   a piezoelectric plate arranged between the substrate and the lens module, and beneath the lens holder and separated from the lens group, wherein when an electric power is provided to the piezoelectric plate, the piezoelectric plate is subjected to a deformation, so that the lens group focuses on the sensing region;
   wherein the piezoelectric plate is in contact with the sensing chip.

2. The camera module according to claim 1, wherein the piezoelectric plate is a piezoelectric ceramic plate or a macro fiber composite (MFC) structure.

3. The camera module according to claim 1, wherein the lens module is a fixed-focus lens module.

4. The camera module according to claim 1, wherein the camera module further comprises a driving chip, which is electrically connected between the substrate and the piezoelectric plate, wherein when the driving chip provides the electric power to the piezoelectric plate, the piezoelectric plate is subjected to the deformation.

5. The camera module according to claim 1, wherein a top surface of the piezoelectric plate is connected with the lens holder of the lens module, and a bottom surface of the piezoelectric plate is connected with the substrate.

6. The camera module according to claim 5, wherein the top surface of the piezoelectric plate is connected with the lens holder of the lens module through a glue.

7. The camera module according to claim 5, wherein the bottom surface of the piezoelectric plate is connected with the substrate through a surface mount technology, or the bottom surface of the piezoelectric plate is connected with the substrate through an adhesive.

8. The camera module according to claim 1, wherein the piezoelectric plate has a hollow structure, and the sensing chip is enclosed by the hollow structure.

9. The camera module according to claim 8, wherein the lens holder has an opening, and a vertical projection area of the opening of the lens holder is greater than a vertical projection area of the hollow structure of the piezoelectric plate.

10. The camera module according to claim 8, wherein a vertical projection area of the hollow structure of the piezoelectric plate is equal to a vertical projection area of the sensing chip.

11. The camera module according to claim 1, wherein the lens group comprises at least one optical lens.

12. The camera module according to claim 1, wherein the substrate is a flexible printed circuit board, a rigid-flex board, a copper clad laminate or a ceramic substrate.

13. The camera module according to claim 1, wherein the camera module further comprises a memory, and a value of the electric power provided to the piezoelectric plate is stored in the memory.

14. The camera module according to claim 1, wherein the camera module is included in a portable electronic device and a vehicular electronic device.

15. The camera module according to claim 1, wherein the piezoelectric plate is separated from the lens holder.

16. A calibration method for a camera module, the camera module comprising a substrate, a sensing chip, a lens module and a piezoelectric plate, the sensing chip being electrically connected with the substrate, the sensing chip being covered by the lens module and arranged between the substrate and the lens module, the lens module comprising a lens holder and a lens group supported on the lens holder, the piezoelectric plate being arranged between the substrate and the lens module, and beneath the lens holder and separated from the lens group, the calibration method comprising steps of:
   if a spacing distance between the lens group and the sensing chip does not match a focal length of the lens group, acquiring a value of an electric power for driving the deformation of the piezoelectric plate to have the spacing distance between the lens group and the sensing chip match the focal length of the lens group;
   storing the value of the electric power; and
   providing the value of the electric power to the piezoelectric plate when the camera module is enabled to perform an image capturing operation;
   wherein the piezoelectric plate is in contact with the sensing chip.

17. The calibration method according to claim 16, wherein the value of the electric power is stored in a memory of the camera module.

18. The calibration method according to claim 16, wherein the lens group comprises at least one optical lens.

* * * * *